Dec. 16, 1969    R. J. HILSINGER    3,483,987
FLUID SEPARATING DEVICE

Filed May 29, 1968    3 Sheets-Sheet 2

INVENTOR.
RUSSELL J. HILSINGER

BY Carl R. Brown

ATTORNEY

Dec. 16, 1969  R. J. HILSINGER  3,483,987
FLUID SEPARATING DEVICE
Filed May 29, 1968  3 Sheets-Sheet 3
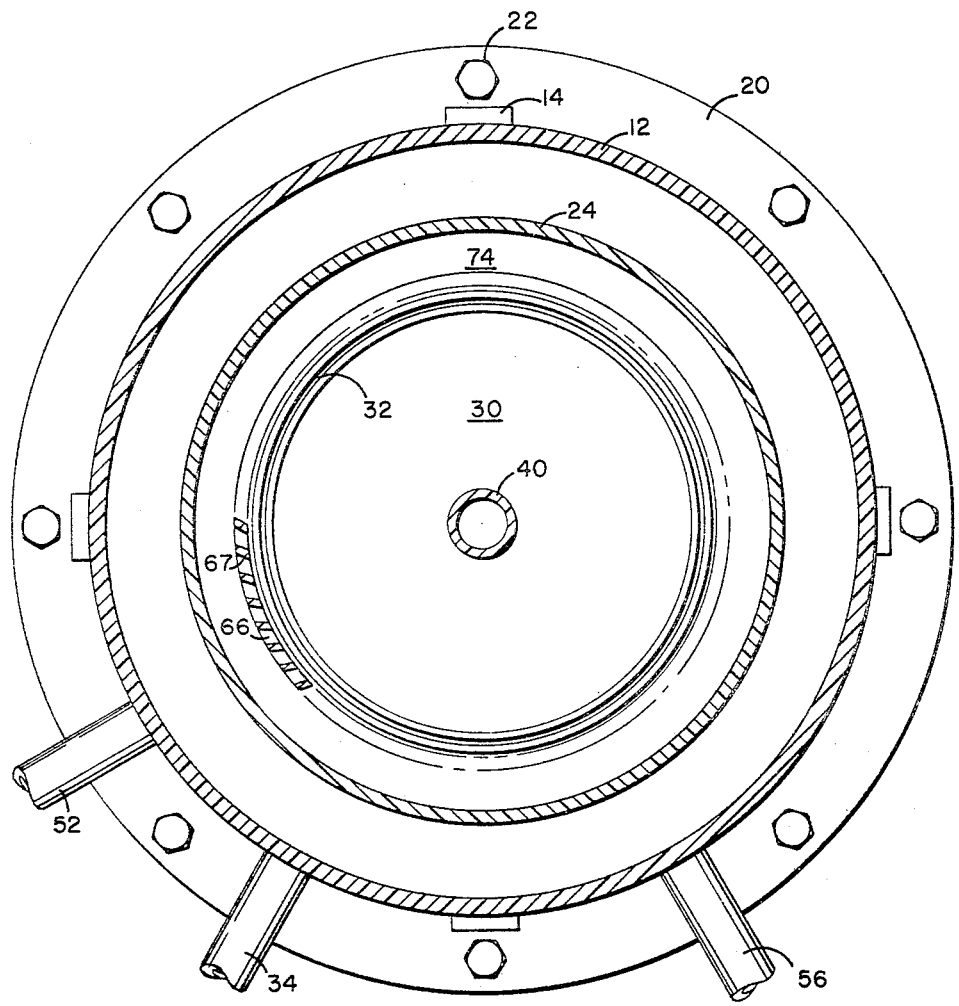
FIG. 3
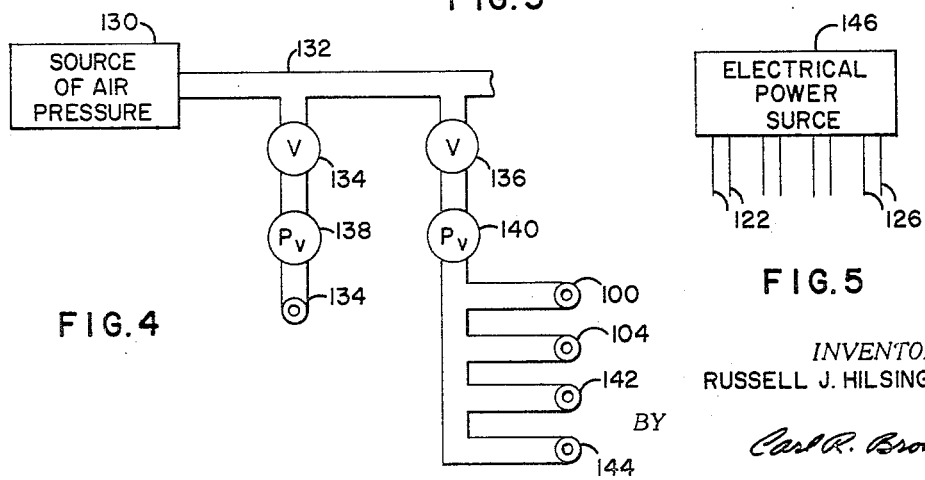
FIG. 4
FIG. 5
INVENTOR.
RUSSELL J. HILSINGER
BY
Carl R. Brown
ATTORNEY

United States Patent Office 3,483,987
Patented Dec. 16, 1969

3,483,987
FLUID SEPARATING DEVICE
Russell J. Hilsinger, San Diego, Calif.
(2512 Agate St., Bakersfield, Calif. 93304)
Filed May 29, 1968, Ser. No. 733,099
Int. Cl. B03c 1/10; B01d 35/06
U.S. Cl. 210—223                    10 Claims

ABSTRACT OF THE DISCLOSURE

A fluid separating device having a center fluid receiving container that rotates at high speeds on an air bearing in a multi-container arrangement and by centrifugal force separates sea water, as for example, into fresh water and a highly concentrated solution of salts, minerals and other impurities.

BACKGROUND OF THE INVENTION

The problem of removing impurities and pollutants from fluids such as water, is well known. This problem is particularly evident in making fresh water from salt water. The removal of minerals, salts, metallic substances and solutions from salt water has proven to be a very difficult and expensive task. Many different processes such as distillation, reverse osmosis and other relatively involved processes have been employed to remove salts and minerals from salt water. These known systems in practical applications, have a relatively low capacity, produce expensive fresh water and require constant maintenance, and further do not remove the impurities in a form to which, for example, the minerals and metals may be extracted and used for other purposes. Also these known processes are not capable of practical alternative application to remove other pollutants in water that present serious problems, as for example pollutants added to fresh water streams from factory water discharge systems.

Accordingly, it is advantageous to have a means for rapidly and easily extracting pollutants, salts, minerals, metals, and the like from water in a rapid, efficient, low cost, and low power requirement installation.

SUMMARY OF THE INVENTION

In an embodiment of this invention, a center fluid receiving container is positioned and supported for high speed rotation, concentrically within second and third containers. The first container has a cylindrical portion with a lower bottom wall and an upwardly and inwardly directed conical upper wall that has a centered opening. Above the centered opening is an upwardly and radially outward projecting lip portion. The wall of the cylindrical portion adjacent the bottom wall has apertures therethrough. The second container encloses the first container and has an opening aligned with the centered opening of the first container. The opening in the second container has a smaller diameter than the lip portion of the first container and is positioned below the lip portion. The third container encloses the second container.

A conduit means, such as a tube, passes fluid to be separated, such as sea water, polluted water or the like, through the wall of the third container and through the aligned openings to the volume of the first container. The first container and the fluid rides on a frictionless air bearing that coacts with the lower surface of the bottom wall. The lower surface of the bottom wall has downwardly directed vanes through which air escaping from the air bearing support passes. The force of the air against the vanes rotates the first container at a very high speed. This imparts large centrifugal forces to the fluid causing the heavier specific gravity fluids and impurities in solution, to move radially outward to the outer walls of the cylindrical portion and to pass through the apertures to the volume of the second container surrounding the first container. The lighter specific gravity clean water flows upwardly in the conical portion of the first cylinder and is discharged out the lip portion with sufficient force that it passes over the lip of the opening in the second container and is collected in the volume of the third container.

Additional rotating force is imparted to the first container, where desired, to achieve greater speed by directing high pressure air through appropriate nozzles against impeller blades that are fixed to the outer surface of the upper portion of the first container at the intersection of the upper and inwardly directed conical portion and the outwardly directed lip portion. The high rotational speed of the first container on the substantially zero-friction, bearing support, allows the first cylinder and the fluid therein to achieve a gyroscopic condition.

Where necessary or desirable, magnetic fields are established across the first container that pull the metal or metallic particles in the fluid outwardly and through the apertures in the side of the cylindrical portion of the first container.

It may thus be seen that in this invention, the first container is the only rotating part of the mechanism and by virtue of its high speed and frictionless rotation, achieves centrifugal forces sufficient to remove impurites from sea water making fresh water. Yet these forces are achieved with relatively small power requirements by employing the same air that provides the air bearing support to rotate the first container.

It is therefore an object of this invention to provide a new and improved fluid separating device.

It is another object of this invention to provide a new and improved fluid separating device that is capable of achieving high quantity fluid separation with a relatively small and compact structure by employing high speed rotational forces to achieve large centrifugal forces.

It is another object of this invention to provide a new and improved fluid separating device that achieves large volume fluid separation without large power requirements, large structures or installations.

It is another object of this invention to provide a new and improved fluid separating device that is relatively inexpensive to construct, has substantially low mass, is stable in operation, and has a relatively light weight.

It is another object of this invention to provide a new and improved fluid separating device that is capable of separating fresh water from sea water pollutants and yet is powered only by high pressure air.

Other objects and many advantages will be apparent upon a reading of the following detailed description and an examination of the drawings wherein like reference numerals designate like parts throughout and in which:

FIGURE 3 is a cross sectional view taken along lines 3—3 of FIGURE 1.

FIGURE 4 is a schematic view of a pressure source system for use in this invention.

FIGURE 5 is a schematic view of an electrical supply source employed in this invention.

Figure 1:
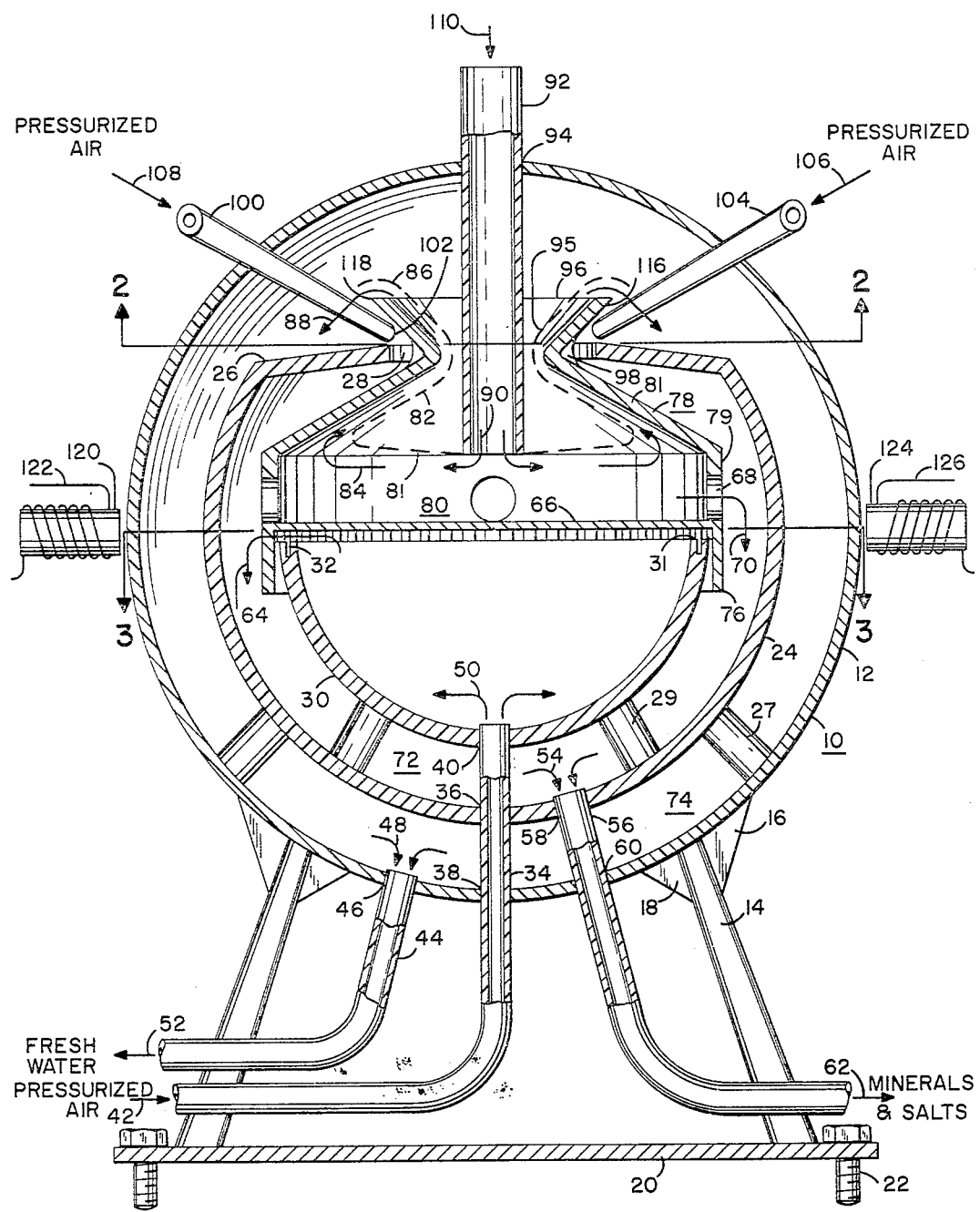
FIGURE 1 is a cross sectional view of an embodiment of the fluid separating device.

Referring now to FIGURE 1, a fluid separating device 10 comprises a first container 78, a second container 24, and a third container 12. The second container 24 and the third container 12 have spherical shapes and are concentrically arranged. The first container 78 has a cylinderical portion 79 with a bottom wall 66 and apertures 68 circumferentially spaced around the wall of the cylindrical portion 79 at points adjacent the bottom wall 66. The upper portion of the cylindrical portion 79 has an inwardly and upwardly directed conical wall portion 81 that has a reduced or small opening 95 to which is integrally connected an outwardly diverging lip portion 116. Also secured to the bottom wall 66 or as a continuation of the cylindrical portion 79 are a plurality of vanes 76. The first container rotor structure may be made of any suitable material, and is preferably made of filament wound boron fiber filaments with epoxy resin binder that is cured in the known manner. The openings between the vanes 76 are precision cut and generally have a 45 degree angle to a line drawn through the center of the cylindrical portion 79. The first container 78 is supported in free floating position on an air bearing support that comprises a pressure chamber 30 having a substantially half spherical configuration with a circumferential edge portion having a continuous slot 32 therein that, in operation, is adjacent the lower surface of the bottom wall 66 and is radially inward from the vanes 76.

A conduit 34 channels pressurized air to the pressure chamber 30 through the third container 12 and the second container 24. The openings through the respective walls are sealed by sealing connections 36, 38 and 40. The pressurized air is supplied by a suitable source 130 and flows in the direction of arrow 42 and feeds into the pressure chamber 30 in the direction indicated by arrows 50. As the air pressure builds up in the pressure chamber, sufficient force is created to raise the first chamber 78. This pressurized air flows between the end surface 31 and the bottom wall 66 and passes through the rotors 76 in the direction of arrow 64. This air flow imparts a rotating force to vanes 76 that rotates the first container 78. Since the rotation of the first container 78 incurs very little friction because of the air bearing support, the container is caused to rotate at an extremely high speed. For example, for air pressures in the pressure chambers up to approximately 1200 pounds, the first container 78 may be rotated at speeds from 10,000 to 150,000 r.p.m. The groove or slot 32 functions to initially lift the first container structure 78 and water that may be therein and to provide an air pressure chamber lock. The pressure chamber 30 provides a reservoir of air for operation of the high speed air bearing and thrust means and the air pressure in the chamber 30 also functions as an air brake to stop the unit from rotating when so desired. The gradual build up of air pressure in the pressure chamber provides equal forces against all of the vanes 76, as the vanes are equally distributed in spaced relationship. This equalization of force centers the first container 78 on the air chamber 30 to achieve centered rotation. After achieving desired rotating speed, the first container 78 has gyroscopic stability. The air from the air chamber 30 escapes out through the output line 54 or the output line 44, which air flow aids in directing the flow of fluids out the respective pipes in a manner that will be more apparent hereinafter.

Figure 2:
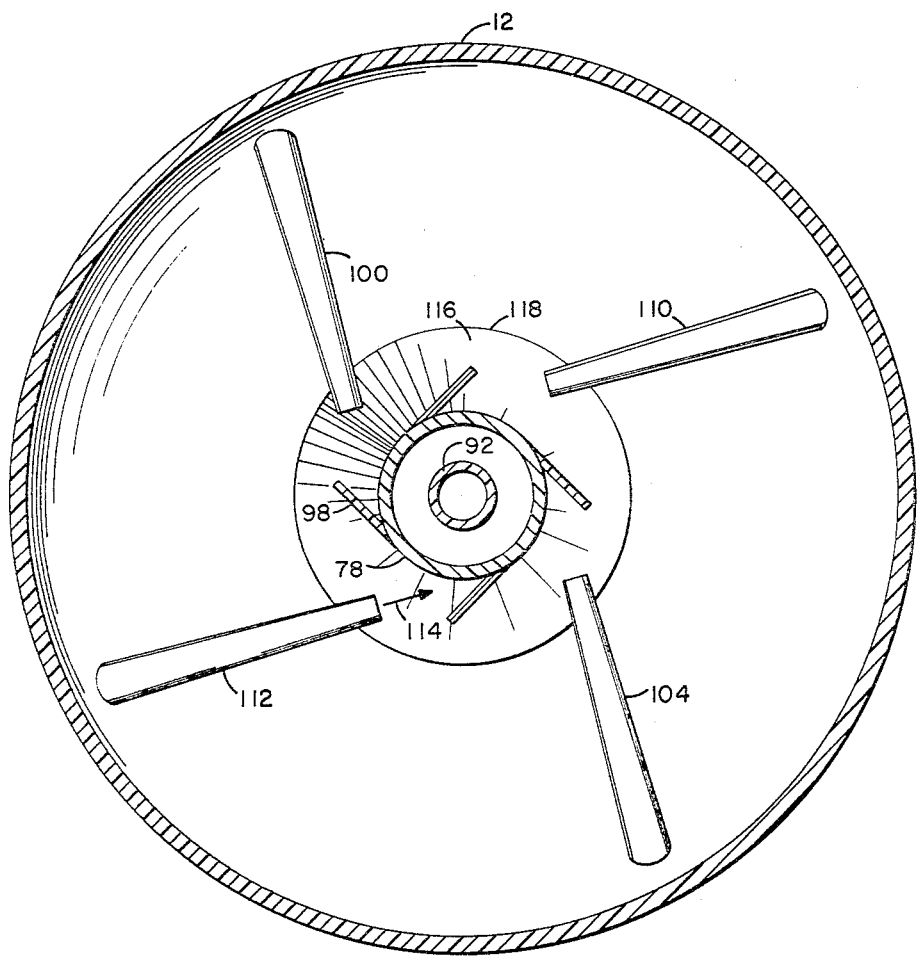
FIGURE 2 is a cross sectional view taken along lines 2—2 of FIGURE 1.

As an added propulsion means, impeller blades 98 are secured in the V-shaped groove between the conical portion 81 and the lip portion 116. Air injection means 100 and 104 receive air under pressure flowing in the direction of arrows 106 and 108 and directs this air through end nozzles 102 against the impeller blades 98. The impeller blades 98 are canted at an angle tangent to the outer circumference of the groove and the air nozzles, that may be four in number corresponding to the number of impelled blades 98, such as nozzles 100, 104, 110 and 112, are canted as illustrated in FIGURE 2. This upper impeller blade propulsion means can be selectively used to provide additional turning force to achieve higher rotational speeds of the first container 78. This often aids in centering the first container 78 in its centered rotational movement on the air bearing.

The second container 24 has a spherical shape with a flat, inwardly directed lip portion 26 at its opening. This lip portion 26 provides space for positioning the air nozzles 100, 104, 110, and 112 and also places the inner edge of the opening inside of the outer edge of the lip portion 116. The outer housing or container 12 has a cylinderical shape that encircles and encloses the entire structure. The third container 12 is supported on a suitable base plate 20 by supports 14 and braces 16 and 18. The base plate 20 may be made of steel or other suitable material that in turn may be secured to any other base by known bolt connector means 22. Supports 14 are positioned around the lower surface of the third container as necessary and desired. The second container 24 is secured and supported in the third container by appropriate spacer blocks 27 and the pressure chamber 30 is supported inside the second container 24 by spacer blocks 29. It being recognized that the spacer blocks 27 and 29 do not interfere with fluid passage to the respective output conduits 44 and 56. The second and third containers may be constructed of epoxy or other suitable construction as are pipes 44 and 56. High pressure pipes 34, 104, 112, and 110 and pressure chamber 30 are preferably filament wound pressure pipes.

OPERATION

In operation, the fluid separation device is bolted in an appropriate location for operation and the fluid discharge lines 44 and 56 are connected to suitable lines leading to discharge tanks or areas (not shown). A source of water to be separated is connected via a suitable line (not shown), to the input line 92. A source of air 130 provides air under pressure to mainfold 132 that through valves 134 and 136 provides air to respective pressure regulators 138 and 140.

In start up operation, a fluid or liquid, such as sea water, flows in the direction of arrows 110 and 90 into the internal volume of the first container 78. At the same time, air is supplied through line 34 in the direction of arrows 42 and 50 to the internal volume of the pressure chamber 30. The air pressure in chamber 30 builds up gradually as does the weight of the sea water 80 in the first container 78, and the air pressure as it builds up causes a gradual increase in the speed of rotation of the container 78. When the first container 78 achieves the desired rotational speed, the heavier specific gravity liquid is forced radially outward by the centrifugal force and through the apertures 68 to the volume 72. This heavier specific gravity solution then flows by gravity in the direction of arrows 70, 54 and 62 through the drain line 56. The fresh water is caused to flow up the inclined surface of the conical portion 81 in the direction of arrow 84 and generally has a volume distribution indicated by the dotted lines 82 and 86. By virtue of the rotation of the first container 78, the fresh water at the lip portion 116 is thrust outwardly in the direction of arrow 88 and over the flat ring surface 26 to the internal volume 74 of the third container 12. The water accumulating in volume 74 flows through drain line 44 in the direction of arrows 48, which drain line 44 is sealed at 46 to the container 12.

As a general construction ratio, the apertures 68 have a total area that is approximately 10% of the cross sectional area of the opening in the inlet pipe 92. This size relationship is optimized to achieve the appropriate volume of water in the spinning chamber and the vortex 81 of liquid. The inner surface of the conical portion 81 is at an angle of 30° relative to the plane of the bottom 66, which is the optimum angle for processing sea water. It should be recognized that other angles may be used to create optimum conditions for processing other and different fluids.

The speed of rotation of the first container 78 is dependent upon the degree of liquid separation desired and the liquid and impurities involved. In separating fresh water from sea water, the speed of operation must be fairly fast and may approach one hundred thousand revolutions per minute.

To further aid in obtaining separation of impurities and the reclamation of impurities in water, as for example sea water, pole cores 120 and 124 having coils 122 and 126 that are representative of at least 4 magnetic field creating poles that are positioned around the outer circumference of the cylindrical and plastic construction housing 12. The poles receive electrical power from an electrical power source 146 to provide an electrical and magnetic field within the chamber of the first cylinder that draws or forces the metal or metallic impurities in the water to the outside of the first container 78 and out the apertures 68 in the direction of arrow 70. This aids in the removal and reclamation of metal particles in solution in the input liquid. It should be recognized that the force of the field is not sufficiently strong to draw and hold metal particles against the inner surface of the second container 24.

It should be recognized that while this invention is particularly adapted to obtaining fresh water from sea water and also in reclaiming metal particles in sea water, it may also be used to remove varied impurities in water such as detergent, industrial waste, pulp manufacturers waste, and other wastes that pollute fresh water.

Having described my invention, I now claim.

1. A fluid separating device for separating different specific gravity fluids, solutions, and solids in fluids comprising,
   first, second and third containers,
   said first container having a cylindrical portion with a bottom wall and an inwardly and upwardly directed conical upper wall with a centered opening,
   the wall of said cylindrical portion having apertures adjacent said bottom wall,
   said second container enclosing said first container and having an opening aligned with said centered opening,
   said third container enclosing said second container,
   conduit means passing through said third container and through said aligned openings for passing fluid into said first container,
   and power means for rotating said first container whereby centrifugal forces cause higher specific gravity fluids to pass out through said apertures to said second container and lower specific gravity fluids pass out through said centered opening to said third container.

2. A fluid separating device as claimed in claim 1 in which,
   said conical upper wall at said centered opening having an upwardly and outwardly diverging lip portion with an edge that extends radially outward beyond the inner edge of the opening in said second container.

3. A fluid separating device as claimed in claim 2 including,
   first drain means for removing fluids, solutions and solids from said second container,
   and second drain means for removing fluids from said third container.

4. A fluid separating device as claimed in claim 2 including,
   air bearing means coacting with the lower surface of said bottom wall for supporting said first container for substantially frictionless rotational movement.

5. A fluid separating device as claimed in claim 4 in which,
   said air bearing means comprising an air chamber with a circular upwardly projecting edge positioned immediately adjacent said bottom wall and radially inside the wall of said cylindrical portion,
   and means for passing air under pressure into said air chamber whereby said pressurized air flows radially outward between said edge and said bottom wall.

6. A fluid separating device as claimed in claim 5 in which,
   said power means including vane means secured to the lower surface of said bottom wall and radially outward from said edge of said air chamber for rotating said first container in response to force created by the flow therethrough of said pressurized air.

7. A fluid separating device as claimed in claim 5 in which,
   said upwardly projecting edge having a given radial end surface,
   and said end surface having a circumferential slot therein.

8. A fluid separating device as claimed in claim 4 in which,
   said power means including circumferentially spaced impeller blades secured to the outer surface of said first container at the intersection of said conical upper wall and said diverging lip portion,
   and air nozzle means for directing pressurized air against said impeller blades.

9. A fluid separating device as claimed in claim 8 in which,
   said second container having a spherical shape with a radially inwardly directed lip portion at said opening in said second container that is positioned below said diverging lip portion, thereby permitting access of said air nozzle means to said impeller blades.

10. A fluid separating device as claimed in claim 2 including,
    means for creating a magnetic field across the diameter of said first container to draw metal particles in the fluid radially outward and through said apertures.

References Cited

UNITED STATES PATENTS

| 1,165,136 | 12/1915 | Shorman | 210—380 X |
| 2,907,465 | 10/1959 | Heckmann et al. | 210—380 |
| 3,400,827 | 9/1968 | Ziherl | 210—380 X |

JAMES L. DECESARE, Primary Examiner

U.S. Cl. X.R.

210—380, 398